July 15, 1969  R. J. SMITH  3,456,153
DUAL FUNCTION LAMP
Filed Feb. 6, 1967  2 Sheets-Sheet 2
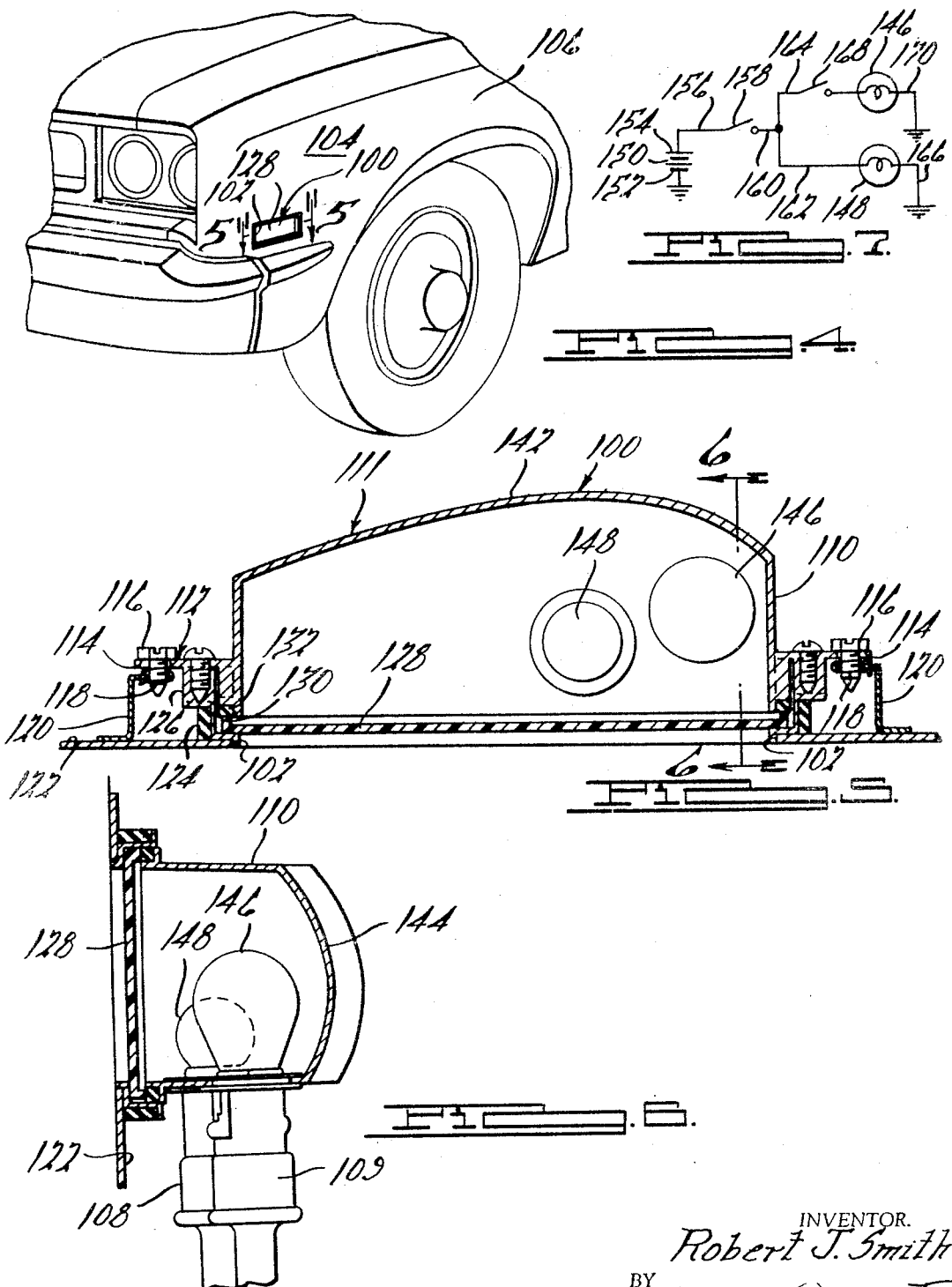

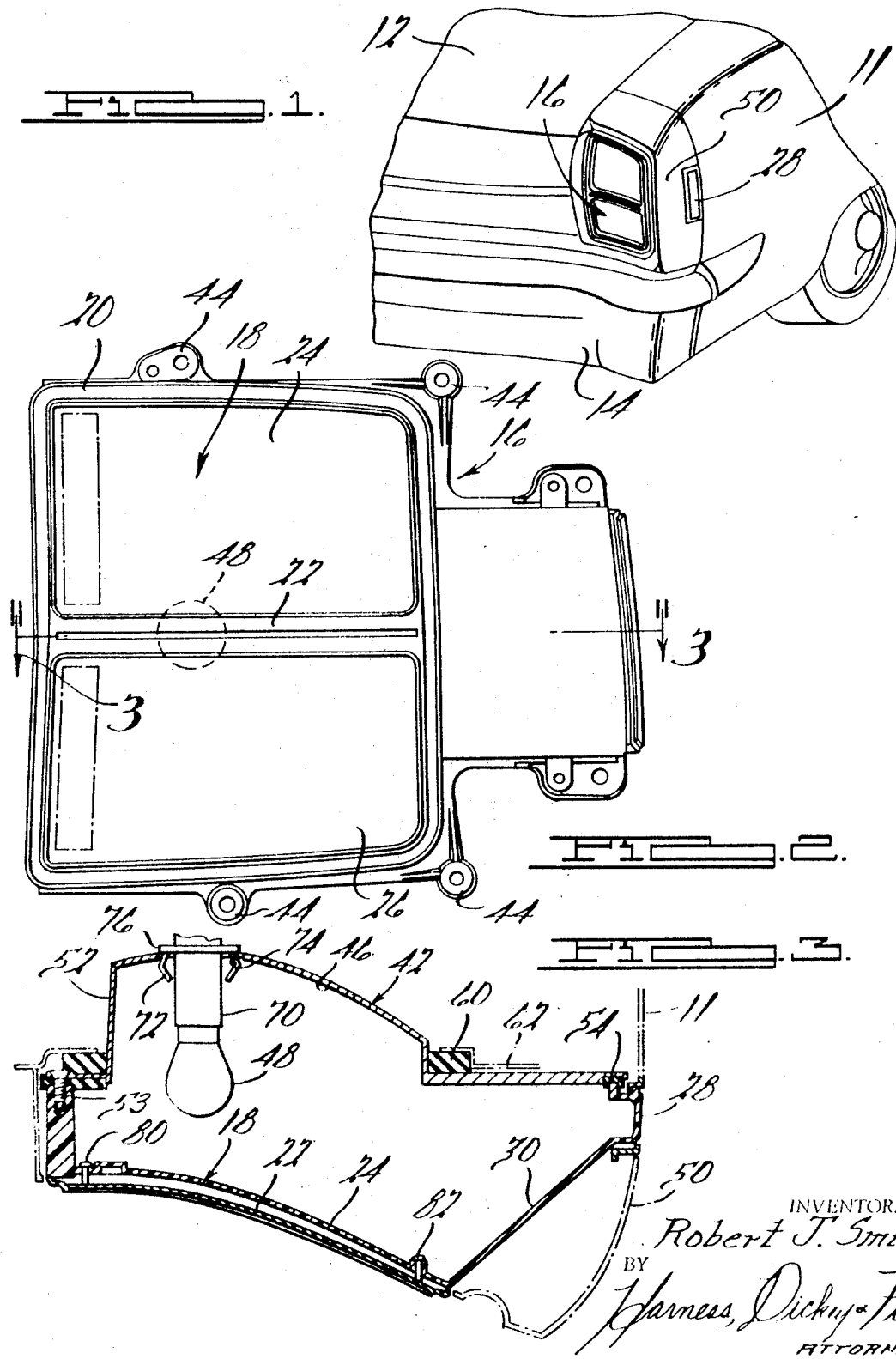

United States Patent Office 3,456,153
Patented July 15, 1969

3,456,153
DUAL FUNCTION LAMP
Robert J. Smith, Farmington, Mich., assignor to C. M. Hall Lamp Company, Detroit, Mich., a corporation of Michigan
Filed Feb. 6, 1967, Ser. No. 614,088
Int. Cl. B60q 1/32; H05b 37/00
U.S. Cl. 315—95     17 Claims

ABSTRACT OF THE DISCLOSURE

A sidemarker system for an automotive vehicle that will assure that the vehicle will be visible in darkness from lateral positions, including components which are visible under normal atmospheric conditions at any time lights are required. The aforementioned abstract is neither intended to define the invention of the application which, of course, is measured by the claims, nor is it intended to be limiting as to the scope of the invention in any way.

BACKGROUND OF THE INVENTION

Field of the invention

This invention pertains to electrical sidemarker devices for an automotive vehicle.

SUMMARY OF THE INVENTION

This invention relates to a lighting system and to composite lamps for both the front and the rear of an automotive vehicle. The rear lamp is in the form of a combined rear lamp of the conventional type and a side marker with interposing sheet metal means positioned between the side marker and the rearwardly facing lens for preventing the projection of light between the side marker and the means for projecting light to the rear of the automotive vehicle.

In addition, the invention relates to a side marker system for the front of an automotive vehicle in which a vehicle lamp is mounted in a fender which includes a first lamp and a second lamp. Circuit means connect the first lamp and a light switch which controls the running lamps of the vehicle for illuminating this first lamp when the light switch is in an "on" position. Circuit means connect the second lamp, the light switch and the turn signal switch for illuminating the second lamp when the light switch and the turn signal switch are both in the "on" position. Means are included for mounting the lamps in the front fender of the automotive vehicle and for causing lights from the lamp to be projected to the side of the vehicle.

BRIEF DESCRIPTION OF THE DRAWINGS

FIGURE 1 shows a perspective view of a rear fender of an automotive vehicle;

FIGURE 2 is a front elevational view of a combined tail and side marker lamp of the present invention;

FIGURE 3 is a sectional view taken along the lines 3—3 of FIGURE 2;

FIGURE 4 is a perspective view of a front fender of an automotive vehicle;

FIGURE 5 is a sectional view taken along the lines 5—5 of FIGURE 4;

FIGURE 6 is a sectional view partially in elevation taken along the lines 6—6 of FIGURE 5; and FIGURE 7 is a circuit diagram for operating the lamps disclosed in FIGURES 4 through 6.

Referring now to the drawings in which like reference numerals designate like parts throughout the several views thereof, there is shown in FIGURE 1 a perspective view of the rear of an automotive vehicle having a rear fender 11, a deck lid 12 and a rear bumper 14. A combined rear tail lamp and side marker lamp 16 is positioned in the rear fender 11 of the vehicle. This combined tail lamp and side marker lamp 16 includes a rearwardly facing lens 18 which may be surrounded or enclosed by a bezel 20 having a horizontally disposed centrally located cross member 22 thereby dividing the lamp into an upper portion 24 and a lower portion 26. A side marker lens 28 is adapted to project light to the side of the vehicle and it is integrally formed with the rearwardly projecting lens 18 by means of a diagonally positioned member 30. In the preferred embodiment of the invention, the side marker lens 28 and the rearwardly projecting lens 18 are intercoupled by a diagonally positioned member 30 constructed of a red plastic material.

A supporting means 42 in the form of a die casting or sheet metal supports the combined tail lamp and side marker lamp 16 in the vehicle by means of outwardly extending bosses which are adapted to receive fastening means for fastening the supporting structure 42 in the vehicle. This supporting structure 42 includes a parabolically shaped reflector 46 which reflects light from the bulb 48 in a rearward direction through the rearwardly facing lens 18. The supporting structure 42 also includes a generally rearwardly extending and side facing flat section 52 which will project light reflected from the lamp 48 in a sideward direction through the side marker lens 28. Incident light from the bulb 48 also is directed through the rear lens 18 and through the side marker lens 28.

The supporting structure 42 is supported in the vehicle in a position as brought out above in which a sheet metal portion 50 of the fender structure 11 is positioned between the rearwardly facing lens 18 and the side marker lens 28. This sheet metal means 50 is shown in generally dotted position in FIGURE 3.

A plurality of screws, one of which is shown at 53 are employed to connect the lens 18 with the supporting structure 42 and as can best be seen by reference to FIGURE 3, this supporting structure 42 is sealed with respect to the lens by a gasket 54 which effectively seals the lens from the backing member or support structure 42. Furthermore, a gasket 60 is employed between the backing member or support structure 42 and the sheet metal 62 of the vehicle shown in dotted line position.

The bulb 48 of the rear lamp is supported in an electrical socket 70 which has spring fingers 72 that may be collapsed as the socket 70 is moved through an aperture 74 in the support structure 42. The socket 70 has a radially extending flange 76 which serves as a stop for the socket 70 and to support it on the outer surface thereof.

The bezel 20 including the cross member 22 is positioned on the lens 18 by pin members 80 and 82. It can readily be appreciated, therefore, that when the bulb 48 is illuminated, as it is when the head and tail lights and the parking lights are illuminated, light from the bulb and is both incidental and reflected will be projected rearwardly through the lens 18 to provide the tail light for the automotive vehicle while simultaneously, light will be projected in a sideward direction through the side marker lens 28 to provide a side marker system for the rear of the automotive vehicle.

Referring now to FIGURE 4, there is shown a lamp fixture generally designated by the numeral 100 which is positioned in an opening in the form of a rectangular aperture 102 in the side 104 of a fender 106 of an automotive vehicle. This lamp fixture 100 includes a lamp 108 and a lamp socket 109 which are mounted in a supporting structure 110 of the lamp 100. This supporting structure 110 includes an outwardly extending peripheral flange 112 which has slots 114 positioned therein for the reception of screws 116 that have threaded portions 118 engaging sheet metal brackets 120 affixed to the inner surface 122 of the fender 106. A gasket 124 is positioned between the inner surface 122 of the fender 106 and a generally rectangular section 126 positioned on the outwardly extending flange 112 to provide a seal between the sheet metal of the fender and the support member 110 of the lamp 100.

A lens 128 of generally rectangular configuration has an inwardly extending peripheral flange 130 engaging a seal 132 positioned against the rectangular section 126 to provide a seal between the lens 128 and the support structure 110.

The support structure 110, as previously indicated, includes a reflector 111 having a parabolic rear section 142 when viewed in a horizontal plane as shown in FIGURE 5 and a generally parabolic reflecting surface 144 when viewed in a vertical plane as shown in FIGURE 6.

The two light sockets 108 and 109 support lamp bulbs 146 and 148 which will project both incident and reflected light through the lens 128 when the lamp bulbs 146 and 148 are illuminated and one of the bulbs is positioned on the focus of the parabola, preferably the bulb 146. The parabolic reflecting surface 142 is positioned on an axis which is canted downwardly with respect to the horizontal by a few degrees so that the light reflected from the lamps 146 and 148 is directed generally outwardly but slightly downwardly when the two lamp bulbs 146 and 148 are energized. It should be readily apparent from an inspection of FIGURE 5 that the lamp 148 and its filament is disposed outwardly and forwardly from the longitudinal center line of the associated vehicle with respect to the lamp 146 and its filament.

It should be realized, however, that instead of employing two lamp bulbs, a single lamp bulb with dual filaments may be employed, with one of the filaments positioned on the focus of the parabola. In this case, the light to be projected may be amber in color from one of the filaments and white from the other, with means being provided to encompass one of the filaments to furnish the amber color.

Referring now to FIGURE 7, there is shown a circuit diagram for energizing the two lamp bulbs 146 and 148. This circuit includes a source of electrical energy, for example, a battery 150 having one terminal 152 connected to ground and another terminal 154 connected through a lead 156 to one terminal of a light switch 158. The other terminal of the light switch 158 is connected through a lead 160 to a pair of leads 162 and 164. The lead 162 is connected to one terminal of the lamp 148 while the other terminal of the lamp 148 is connected to ground through a lead 166. The lead 164 is connected through a turn signal switch 168 to one terminal of the lamp 146, while the other terminal of the lamp 146 is connected to ground through a lead 170.

It can be appreciated from the circuit diagram shown in FIGURE 7 and the explanation given above that when the light switch 158 is in the closed position, the lamp 148 will be illuminated. Furthermore, when both the light switch 158 and the turn signal switch 168 are closed, the lamp 146 will be illuminated. The lamp 146 is preferably a clear bulb which will project white light to the side of the vehicle when the turn signal switch 168 is positioned to indicate a turn. It should be noted, however, that the circuit connection for energizing the lamp 146 does not pass through the flasher of the turn signal system. As a result, the lamp 146 is energized to glow steadily and to furnish a steady illuminating light directed toward the side of the vehicle during turning maneuvers. On the other hand, the lamp 148 is amber in color and is employed as a side marker device which burns steadily when the light switch 158, which may control either the headlights, the tail lights or the parking lights or any combination thereof is in the "on" position.

The automotive vehicle disclosed would, in practice, employ two combined rear tail and side marker lamps 16 positioned in either rear fender 11 of the automotive vehicle, and the front of the automotive vehicle would have the lamps 100 in the form of the electrical side marking devices positioned in both the front fenders thereof to provide a side marker system on each side of the vehicle.

The side marker system components of the present invention preferably are visible under normal atmospheric conditions at any time lights are required. Both the front and rear side marker components preferably are visible to approaching vehicles from a distance of at least 600 feet to within no less than 100 feet of the marked vehicle. The side marker components of the present invention including light projecting through the lens 28 and projecting through the lens 128 preferably are visible from all positions on each side beginning at the points where the headlights can just be seen continuing around the vehicle to the points where the tail lights can just be seen.

The present invention as thus constituted and described above provides a readily visible side marker system for an automotive vehicle which will provide a safety means that can be viewed by persons who are located at the side of the vehicle in a position where the headlamps and tail lights of the vehicle are not visible.

What is claimed is:

1. A lighting system for an automotive vehicle comprising a first filament and a second filament, a light switch adapted to control running lamps on the automotive vehicle, a turn signal switch adapted to control the turn signals of the vehicle, circuit means connecting said first filament and said light switch for illuminating said first filament when said light switch is in the "on" position, and circuit means connecting said second filament, said light switch and said turn signal switch for illuminating said second filament when said light switch and said turn signal switch are both in the "on" position, and means for mounting said lamps in the front fender of the vehicle and for causing light from said filaments to be projected to the side of the vehicle.

2. The combination of claim 1 in which said second filament projects white light.

3. The combination of claim 2 in which said first filament projects amber light.

4. The combination of claim 1 in which said first filament is positioned forwardly of and outboard of the second filament with respect to the longitudinal axis of the vehicle.

5. A lighting fixture for the rear of an automotive vehicle comprising a supporting structure adapted to support a lamp bulb, a lens having means for projecting light to the rear of the automotive vehicle and having means for projecting light to the side of the automotive vehicle and means interposed between said first and second-mentioned means for preventing the projection of light between said first and said second-mentioned means.

6. The combination of claim 5 in which said supporting structure supports a single lamp bulb.

7. The combination of claim 5 in which said supporting structure comprises a reflector having a parabolically-shaped section facing said first-mentioned means and a generally flat surface generally parallel to the axis of the vehicle and facing said second-mentioned means and positioned on the side of the bulb opposite the means for projecting light to the side of the automotive vehicle.

8. The combination of claim 5 in which said second-mentioned means comprises a generally flat surface positioned in a plane generally parallel to the axis of the vehicle.

9. The combination of claim 6 in which said lens comprises a rearwardly facing means and a flat surface integrally formed with means interconnecting said rearwardly facing means and said flat surface and said sheet metal means is disposed over said means interconnecting said rearwardly facing means and said flat surface.

10. In an automotive vehicle, a combination tail lamp and side marker device comprising a lamp bulb, means for mounting said lamp bulb, a lens having a rearwardly facing portion and a side facing portion and means interposed between said rearwardly facing portion and said side facing for preventing the projection of light therethrough.

11. The combination of claim 10 in which said lens includes integrally formed means interconnecting said rearwardly facing portion and said side facing portion.

12. A vehicle lamp adapted to be positioned in the front fender of an automotive vehicle and comprising a support structure, a pair of lamp filaments positioned in said support structure, said support structure including a parabolic reflecting surface having a focus, one of said filaments being positioned on said focus and the other being offset with respect to said focus.

13. The combination of claim 12 in which one of said filaments projects amber light and the other of said filaments projects white light.

14. The combination of claim 13 in which a lens is positioned on said support structure.

15. The combination of claim 12 in which two separate bulbs are provided with one of said filaments being positioned in one of said bulbs and the other of said filaments being positioned in the other of said bulbs.

16. The combination of claim 1 further including a supporting structure for supporting said first and said second filaments and adapted to be affixed to the front fender of the vehicle.

17. The combination of claim 16 wherein the supporting structure includes a parabolic reflecting surface having a focus, one of said filaments being positioned on said focus.

References Cited
UNITED STATES PATENTS

| | | | |
|---|---|---|---|
| 3,373,311 | 3/1968 | Neulinger et al. | 315—83 |
| 3,196,265 | 7/1965 | Schneider | 240—7.1 |
| 2,113,829 | 4/1938 | Condon | 340—93 |

JOHN W. HUCKERT, Primary Examiner

B. ESTRIN, Assistant Examiner

U.S. Cl. X.R.

240—7.1, 8.2, 8.3; 315—82, 83; 340—81, 89